(12) United States Patent
Tanaka

(10) Patent No.: US 9,865,285 B2
(45) Date of Patent: Jan. 9, 2018

(54) WIRING THIN PLATE WITH A WIRING PART AND A PROTRUSION HAVING THE SAME HEIGHT, FLEXURE AS THE WIRING THIN PLATE AND METHOD OF WELDING OF THE WIRING THIN PLATE

(71) Applicant: NHK SPRING CO., LTD., Yokohama-shi, Kanagawa (JP)

(72) Inventor: Naoki Tanaka, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 15/168,907

(22) Filed: May 31, 2016

(65) Prior Publication Data

US 2016/0351215 A1 Dec. 1, 2016

(30) Foreign Application Priority Data

May 28, 2015 (JP) ................................. 2015-108982

(51) Int. Cl.
*G11B 5/48* (2006.01)
*B23K 26/22* (2006.01)
*B23K 26/32* (2014.01)
*B23K 101/36* (2006.01)

(52) U.S. Cl.
CPC ............ *G11B 5/4826* (2013.01); *B23K 26/22* (2013.01); *B23K 26/32* (2013.01); *B23K 2201/36* (2013.01)

(58) Field of Classification Search
CPC ...... G11B 5/4826; B23K 26/22; B23K 26/32; B23K 2201/36
See application file for complete search history.

(56) References Cited

U.S. PATENT DOCUMENTS

| 5,201,458 | A | * | 4/1993 | Hagen | G11B 5/4833 219/121.64 |
|---|---|---|---|---|---|
| 5,734,526 | A | * | 3/1998 | Symons | G11B 5/4826 360/244.3 |
| 5,748,409 | A | * | 5/1998 | Girard | G11B 5/4826 360/245 |
| 6,512,657 | B2 | * | 1/2003 | Heist | G11B 5/4833 360/244.6 |
| 7,782,570 | B1 | * | 8/2010 | Theis | G11B 5/4833 360/245.2 |
| 8,351,160 | B2 | * | 1/2013 | Fujimoto | G11B 5/486 310/323.06 |
| 2008/0062567 | A1 | | 3/2008 | Toukairin et al. | |
| 2015/0352672 | A1 | * | 12/2015 | Kinoshita | B23K 26/322 219/121.63 |
| 2016/0267929 | A1 | * | 9/2016 | Someya | G11B 5/4833 |

FOREIGN PATENT DOCUMENTS

JP 2008-071401 3/2008

* cited by examiner

*Primary Examiner* — Brian Miller
(74) *Attorney, Agent, or Firm* — Norris McLaughlin & Marcus P.A.

(57) ABSTRACT

Provided is a wiring thin plate capable of securely holddown the wiring thin plate around a scheduled portion to be a welded spot even if the wiring thin plate is downsized and involves widened wiring traces. The wiring thin plate includes a metal supporting layer, an insulating layer on the supporting layer, a wiring part having a plurality of wiring traces on the insulating layer, a scheduled portion defined on the supporting layer to be welded, and a protrusion formed on the supporting layer for the scheduled portion and having a height that is the same as a height of the wiring part.

10 Claims, 16 Drawing Sheets

WIRING THIN PLATE WITH A WIRING PART AND A PROTRUSION HAVING THE SAME HEIGHT, FLEXURE AS THE WIRING THIN PLATE AND METHOD OF WELDING OF THE WIRING THIN PLATE

BACKGROUND OF THE INVENTION

1. Field of the Invention

The present invention relates to a wiring thin plate applied to a flexure of a head suspension or the like, the flexure of the head suspension and a method of welding the wiring thin plate.

2. Description of Related Art

A hard disk drive incorporates hard disks that are provided so as to rotate at high speed and head suspensions with sliders that are slightly lifted from the respective hard disks to write/read data to and from the hard disks. FIG. 28 illustrates a head suspension with a slider disclosed in JP2008-71401A. The head suspension 100 includes a load beam 101, a base plate 103 and a flexure 105 attached to the load beam 101 and the base plate 103.

The flexure 105 includes a wiring part 109 provided on a metal substrate 107 and a tongue 110 on which a slider 111 is supported. The slider 111 includes read/write elements to which the wiring part 109 is connected. In the head suspension, the flexure 105 is joined to the load beam 101 and the base plate 103 at welded spots 113, 115, 117, 119 and the like by laser welding in general. A tail portion 105a of the flexure 105 extends outward from the base plate 103.

The welded spots 113, 115, 117 and 119 are provided at appropriate locations between wiring traces and/or out of the wiring traces or the like in view of locational balance among the welded spots and of locational spaces. In the case of the welded spots 117 and 119 provided between the wiring traces, a location between paired wiring traces is avoided for the locations of the welded spots 117 and 119 to prevent deterioration in electric characteristic.

When conducting the laser welding to join the flexure 105 having the wiring to the load beam 101 and the base plate 103, it is extremely important for quality of the welded spots that the flexure 105 is brought into close contact with the load beam 101 and the base plate 103. If the close contact is insufficient to involve a gap, the laser welding may form a hole and cause scattering and deformation on the flexure 105, the load beam 101 and the base plate 103 to form a defective nugget.

A metal substrate 107 of the flexure 105 is so thin that a portion around a location to be welded needs to be firmly held down by a welding jig.

FIG. 29 is a schematic plan view partly illustrating the head suspension around one welded spot of FIG. 28, FIG. 30 is a schematic sectional view partly illustrating the same as well as a welding jig. FIG. 31 is a plan view partly illustrating a small head suspension to which a flexure is attached, FIG. 32 is a schematic plan view partly illustrating a welded spot of the head suspension of FIG. 31 and FIG. 33 is a schematic sectional view partly illustrating the same as well as a welding jig.

As illustrated in FIGS. 28 to 30, the conventional head suspension has a sufficient space to form relatively-large projections 114 that outwardly protrude from the wiring part 109. When the welded spots 113 are formed on the projections 114, each projection 114 is easily held down around the welded spot 113 with a circumferential holding portion 123b of a welding jig 123 through which a through hole 123a goes.

A recent head suspension, however, is downsized according to downsizing of a hard disk and also involves widened wiring traces. As illustrated in FIG. 31, therefore, the projections 125 outwardly protruding from the wiring part 109 in the downsized head suspension have to be downsized. This makes it hard to hold down each projection 125 around the welded spot 129 with the conventional welding jig 127.

To solve the problem, the holding portion 127b of the welding jig 127 may be downsized as illustrated in FIGS. 32 and 33, The downsized holding portion 127b, however, does not effectively hold down the projection 125 if the welding jig 127 is deviated or shifted even a little from the most appropriate position.

In particular, the laser welding in practice is conducted to a plurality of semi-finished products that are chained together with a frame to produce a plurality of head suspensions. For this, the welding jig 127 has a plurality of united holding portions 127b for the respective chained semi-finished products. The united holding portions 127b of the welding jig 127 are positioned to the chained semi-finished products, respectively. Thus, each one holding portion 127b is likely to deviate from the corresponding projection 125 or location to be welded, to cause a problem of the ineffective holding.

Such a problem is occurred at not only the projection 125 formed to the flexure 105 and welded to the load beam 101 but also a projection welded to the base plate and a location between the wiring traces other than the projection. Further, such the problem may be occurred in a wiring thin plate for other products.

SUMMARY OF THE INVENTION

An object of the present invention is to provide a wiring thin plate, a flexure as the wiring thin plate and a method of welding the thin plate capable of securely hold-down the wiring thin plate around a scheduled portion to be a welded spot even if the wiring thin plate is downsized and/or involves widened wiring traces.

In order to accomplish the object, a first aspect of the present invention provides a wiring thin plate, having a supporting layer made of metal, an insulating layer provided on the supporting layer, a wiring part having a plurality of wiring traces provided on the insulating layer, a scheduled portion defined on the supporting layer to be welded for forming a welded spot through which the supporting layer is joined to a metal member, and a protrusion formed on the supporting layer for the scheduled portion and having a height that is the same as a height of the wiring part.

A second aspect of the present invention provides a flexure for a head suspension rising the wiring thin plate according to the first aspect. The flexure includes a slider provided to the supporting layer and having read/write elements to which the wiring part is connected. The supporting layer is to be joined to a base plate or a load beam of the head suspension serving as the metal member through the welded spot to be formed on the scheduled portion.

A third aspect of the present invention provides a method of welding the wiring thin plate according to the first aspect to a metal member. The method includes steps of overlaying the wiring thin plate and the metal member one on another, bringing a flat face of a welding jig into contact with the wiring part and the protrusion of the wiring thin plate so that the flat face spans from the wiring part to the protrusion and a through hole of a welding jig is aligned with the scheduled portion, and conducting welding to the scheduled portion through the through hole to form the welded spot.

According to the first aspect, the wiring thin plate allows a flat face of a welding jig to be brought into contact with the wiring part and the protrusion having the same height around the scheduled portion to be the welded spot. This securely holds down the wiring thin plate around the scheduled portion even if a space for the hold-down is restricted due to the downsizing of the wiring thin plate and the like.

The protrusion is not the wiring part and therefore is adjustable in size and the like when forming the protrusion, and is surely arranged even in a restricted space.

According to the second aspect, the protrusion is allowed to be surely arranged even in a restricted space and the flexure is securely held down around the scheduled portion.

According to the third aspect, the method presses both the wiring part and the protrusion with the flat face of the welding jig to easily and surely hold down the wiring thin plate around the scheduled portion even if the through hole of the welding jig and the scheduled portion are deviated from each other in a measure.

DETAILED DESCRIPTION OF EMBODIMENTS

Figure 1:
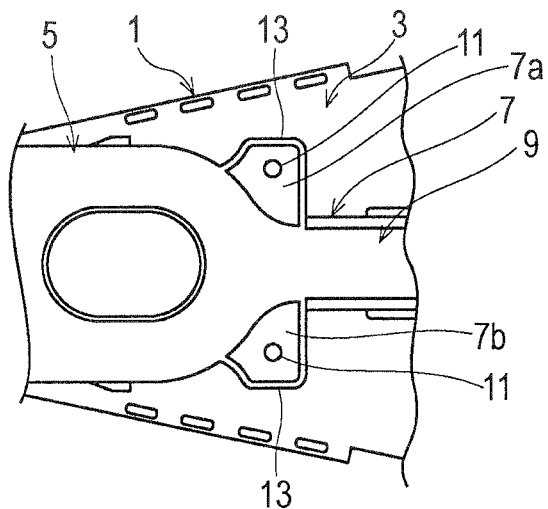
FIG. 1 is a plan view partly illustrating a small head suspension to which a flexure according to a first embodiment of the present invention is attached.

Hereinafter, embodiments for a wiring thin plate applied to a flexure of a head suspension and a method of welding the same will be explained. Each embodiment securely holds down the wiring thin plate around a scheduled portion to be a welded spot even if the wiring thin plate is downsized and/or involves widened wiring traces.

The wiring thin plate according to each embodiment includes a supporting layer made of metal, an insulating layer provided on the supporting layer, a wiring part having a plurality of wiring traces provided on the insulating layer, a scheduled portion defined on the supporting layer to be welded for forming a welded spot through which the supporting layer is joined to a metal member, and a protrusion formed on the supporting layer for the scheduled portion and having a height that is the same as a height of the wiring part.

The wiring thin plate may include a projection formed to the supporting layer and protruding outward from the wiring part to define the scheduled portion on the projection, and the protrusion may be continuously or partly provided on a portion of the projection surrounding the scheduled portion.

The wiring thin plate may include an intervening portion of the supporting layer exposed between the wiring traces of the wiring part to define the scheduled portion on the intervening portion, and the protrusion may be circumferentially continuously or circumferentially partly provided on a portion of the intervening portion surrounding the scheduled portion.

The protrusion may have the same sectional layered structure as the wiring past.

The protrusion may be made of the same material as the insulating layer.

The wiring thin plate as the flexure may include a slider provided to the supporting layer and having read/write elements to which the wiring part is connected, and the supporting layer may be to be joined to a base plate or a load beam of the head suspension serving as the metal member through the welded spot to be formed on the scheduled portion.

The flexure may include a tongue onto which the slider is attached provided at a front end portion of the supporting layer in a longitudinal direction and a front projection formed to the supporting layer and longitudinally forward protruding relative to the tongue to define the scheduled portion on the front projection. The protrusion may be formed on a portion of the front projection surrounding the scheduled portion.

The protrusion may be formed onto an edge of the front projection or each one of said edge and a portion between the scheduled portion and the wiring part.

The protrusion may be arranged symmetrically in a sway direction of the head suspension.

A method of welding the wiring thin plate to a metal member, includes steps of overlaying the wiring thin plate and the metal member one on another, bringing a flat face of a welding jig into contact with the wiring part and the protrusion so that the flat face spans from the wiring part to the protrusion and a through hole of the welding jig is aligned with the scheduled portion, and conducting welding to the scheduled portion through the through hole to form the welded spot.

A head suspension and a flexure as the wiring thin plate according to the first embodiment will be explained. FIG. 1 is a plan view partly illustrating a small head suspension to which a flexure according to the first embodiment of the present invention is attached. In the following explanation, "right" and "left" mean both sides in a lateral direction (being a sway direction of the head suspension) orthogonal to a longitudinal direction of the flexure, "up" and "down" mean both sides in a thickness direction of the flexure, and "front" and "rear" mean a tongue side and a tail side of the flexure in the longitudinal direction, respectively. The head suspension 1 according the first embodiment is basically similar to the head suspension 100 of FIG. 28 according to the related art and therefore FIG. 28 may be referred for the structure of the head suspension 1.

The head suspension 1 of FIG. 1 has a load beam 3, a base plate (not illustrated) and a flexure 5 attached to the load beam 3 and/or the base plate. The flexure 5 is an example of the wiring thin pate and supports at a front end thereof a slider (not illustrated) that is used to write and read data to and from a hard disk (not illustrated). As other examples of the wiring thin plate, there are circuit boards of electric parts other than the flexure 5.

The flexure 5 has a metal substrate 7 and a wiring part 9. The metal substrate 7 is the supporting layer made of metal. According to the embodiment, the metal substrate 7 is a resilient precision metal thin plate or foil made of, for example, stainless steel having a thickness in the range of, for example, about 12 to 25 μm. The wiring part 9 includes a plurality of read/write wiring traces arranged on a top face of the metal substrate 7. The read and write wiring traces are arranged nearly in parallel in the right-left direction.

The flexure 5 extends along the load beam 3 and is firmly fixed to the load beam 3 and the base plate at given portions (FIG. 28) by laser spot welding. The load beam 3 and the base plate are metal plates or members made of stainless steel or other metal material. A base end of the flexure 5 is provided with a tail portion and a front end of the flexure 5 is provided with a tongue that is supported with a pair of outriggers.

The tongue is pivotally supported with a dimple (not illustrated) formed at a front end of the load beam 3. Onto a top face of the tongue, a slider is attached. The slider has read/write elements to which the read/write wiring traces of the wiring part 9 are connected, respectively.

Figure 2:
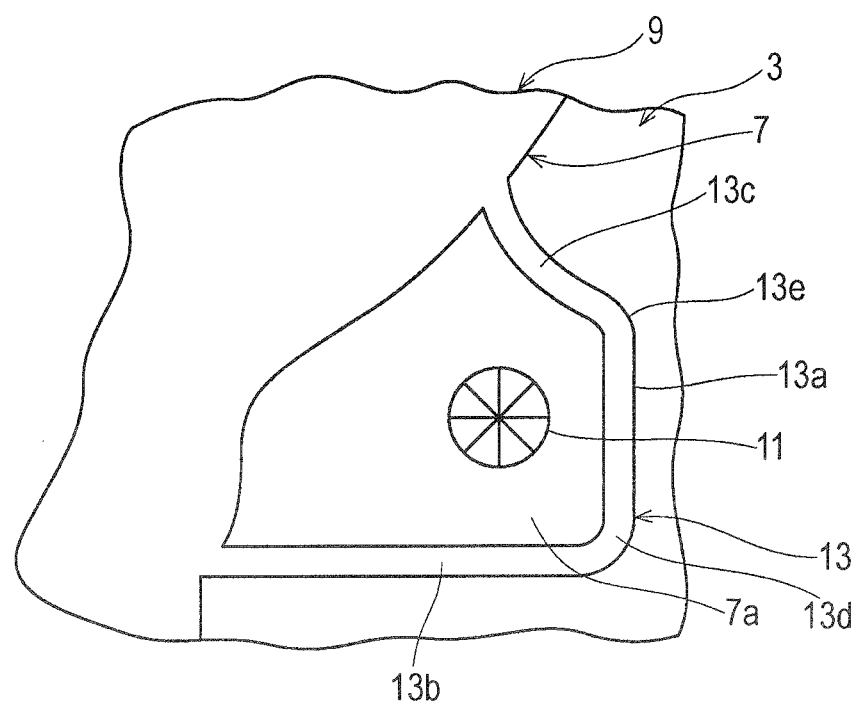
FIG. 2 is a plan view partly illustrating a welded spot in the longitudinal middle of the flexure of the head suspension of FIG. 1.
Figure 3:
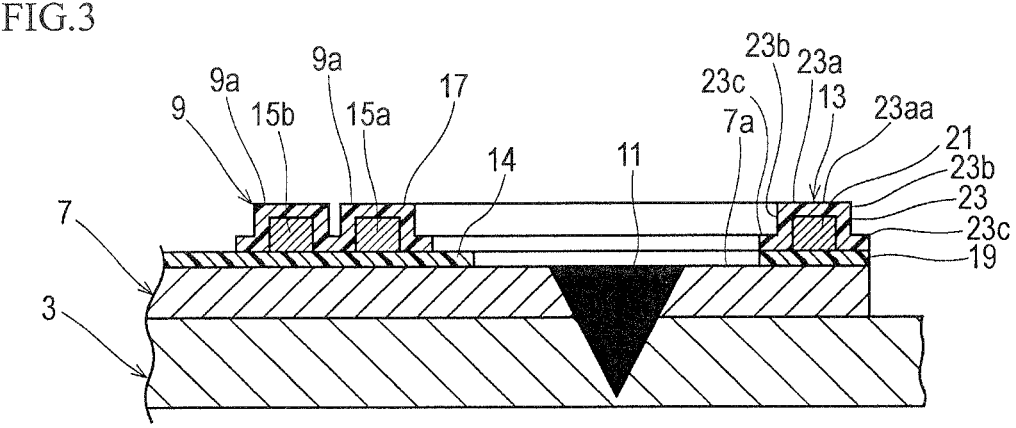
FIG. 3 is a sectional view partly illustrating a sectional structure around the welded spot of FIG. 2.

FIG. 2 is a plan view partly illustrating a welded spot 11 in the longitudinal middle of the flexure 5 of the head suspension 1 of FIG. 1 and FIG. 3 is a sectional view partly illustrating a sectional structure around the welded spot 11 of FIG. 2. FIG. 2 corresponds to the part of FIG. 1 rotated by 90° in a clockwise direction.

As illustrated in FIGS. 1 and 2, the metal substrate 7 includes projections 7a and 7b on the respective right and left sides of the main body of the metal substrate 7 in the longitudinal middle. The projections 7a and 7b are integrated with the main body of the metal substrate 7 and have wing shapes projected outward from the main body of the metal substrate 7 in an in-plane direction of the metal substrate 7. The projections 7a and 7b are located out of the wiring part 9, allow the metal substrate 7 to be joined to the load beam 3 through welded spots 11.

The locations of the projections 7a and 7b of FIGS. 1 and 2 are examples and the projections 7a and 7b may be arranged on the other locations capable of joining the metal substrate 7 to the load beam 3 and/or the base plate by welding.

In each one of the projections 7a and 7b, a protrusion 13 is continuously provided on a portion of the projection surrounding the welded spot 11 formed by spot welding. The welded spot 11 corresponds to a scheduled portion to be welded by the spot welding in a discrete flexure 5 that has not been attached to the load beam 3 or the base plate. The protrusions 13 of the respective projections 7a and 7b are symmetric and have the same structure. Regarding the right and left projections 7a and 7b and the right and left protrusions 13, therefore, only the right projection 7a and the right protrusion 13 will be explained.

According to the embodiment, the protrusion 13 is continuously formed onto and along an edge of the projection 7a and is electrically insulated from the wiring part 9 as explained later to compose a simple protrusion.

The protrusion 13 has a first portion 13a, a second portion 13b and a third portion 13c. The first portion 13a has a linear shape extending in a front-rear direction or longitudinal direction. The first portion 13a is located away from the wiring part 9 in the right-left direction. The second portion 13b has a linear shape extending in a right-left direction or lateral direction and spans from the wiring part 9 to the first portion 13a. The third portion 13c has an arc shape extending from the first portion 13a to the wiring part 9. Between the first portion 13a and the second portion 13b, a first corner portion 13d is formed to connect ends of the first and second portions 13a and 13b to each other. Between the first portion 13a and the third portion 13c, a second corner portion 13e is formed to connect ends of the first and third portions 13a and 13c to each other. The first and second corner portions 13d and 13e have an arc shape. With this configuration, the protrusion 13 is led from and to the wiring part 9 to encircle the welded spot 11.

As illustrated in FIG. 3, the protrusion 13 according to the embodiment has the same sectional layered structure as the wiring part 9 and is entirely a dummy wiring part.

The wiring part 9 in the sectional structure includes a base layer 14, wiring traces 15 and a cover layer 17.

The base layer 14 is made of insulating resin such as polyimide. The base layer 14 is a thin plate layered on the metal substrate 7, and in particular on a top face of the metal substrate 7. The base layer 14 secures electrical insulation for the wiring traces 15. According to the embodiment, the base layer 14 extends along the back faces (lower faces in FIG. 3) of the wiring traces 15 in a routing direction of the wiring traces. In the cross section on a plane orthogonal to the routing direction, the base layer 14 is formed into a flat shape so as to span the wiring traces 15 in the right-left direction. The base layer 14 has a thickness in a range of, for example, about 10 to 20 µm. This thickness, however, may be adjusted depending on a required dielectric strength voltage.

A plurality of the wiring traces 15 are arranged for read/write function and/or other optional functions and each one wiring trace 15 is made of for example, highly conductive metal such as copper. The wiring trace 15 is a thin plate or bar layered on the base layer 14, and in particular on a top face of the base layer 14. The wiring trace 15 has a rectangular section with a thickness in a range of for example, about 3 to 18 µm.

The cover layer 17 is a thin plate that covers the wiring past 9 and is made of insulating resin such as polyimide. The cover layer 17 coats the wiring traces 15 of the wiring part 9 so as to have a thickness less than the base layer 14. The thickness of the cover layer 17 is set in a range of, for example, about 1 to 5 µm.

The protrusion 13 in the sectional layered structure includes a base layer 19, a conductive layer 21 and a cover layer 23. The protrusion 13 has the constant sectional shape in an extending direction thereof and has the same height as the wiring part 9. The protrusion 13 may vary in sectional shape in the extending direction e.g. vary in width in the plan view of FIG. 2 as long as the protrusion 13 has the same height as the wiring part 9.

The base layer 19 corresponds to the base layer 14 of the wiring part 9. Similarly, the conductive layer 21 corresponds to the wiring trace 15 and the cover layer 23 corresponds to the cover layer 17. The base layer 19, the conductive layer 21 and the cover layer 23 of the protrusion 13 are formed as the dummy wiring part simultaneously with the base layer 14, the wiring traces 15 and the cover layer 17 of the wiring part 9, respectively.

The base layer 19 of the protrusion 13 is a band or plate having a rectangular section with a wider width than the conductive layer 21, to stably support the conductive layer 21 and reinforce the projection 7a with a band region spanning inward from the outer edge of the projection 7a. The outer edge of the base layer 19 is located onto and along the outer edge of the projection 7a. Namely, the outer edges of the base layer 19 and the projection 7a match with each other in the plan view. The outer edge of the base layer 19 may be entirely or partly shifted inward from that of the projection 7a.

The conductive layer 21 of the protrusion 13 is a thin plate or bar having the same sectional shape as the wiring trace 15 and serves as a core of the protrusion 13.

The cover layer 23 of the protrusion 13 has a top wall 23a, side walls 23b and flanges 23c so as to cover or coat a top face and side faces of the conductive layer 21. As illustrated in FIGS. 2 and 3, the top wall 23a is the portion covering the top face of the conductive layer 21 and the side walls 23b the portions covering the respective side faces of the conductive layer 21. The flanges 23c outward extend from the side walls 23b so that lateral outer edges of the flanges 23c match with the respective lateral outer edges of the base layer 19 in the plan view. The outer edge of the lateral outer flange 23c, therefore, is located onto and along the outer edge of the projection 7a.

The top wall 23a of the protrusion 13 has a top face 23aa being flat in the same way as the top face 9a of the wiring part 9. The top face 23aa of the top wail 23a is positioned at the same height from the metal substrate 7 as the top face 9a of the wiring part 9. The heights of the wiring part 9 and the protrusion 13 may be different from each other within tolerance that allows the wiring part 9 and the protrusion 13 to be simultaneously pressed with a flat face of a flat welding jig.

The conductive layer 21 of the protrusion 13 is separated from the wiring traces 15 though the protrusion 13 is continuously formed from the wiring part 9 as mentioned above. The base layer 19 and the cover layer 23 integrally continue to the base layer 14 and the cover layer 17 of the wiring part 9, respectively.

The electric separation of the protrusion 13 with respect to the wiring part 9 may be established at any part of the protrusion 13 in a continuation direction of the protrusion 13. According to the embodiment, the electric separation relative to the wiring part 9 is established at ends of the protrusion 13 in the continuation direction. The electric separation may be at a center of the protrusion 13 in the continuation direction.

The protrusion 13 may have a different sectional shape from the wiring part 9 as long as the top face 23aa or the top edge of the protrusion 13 has the same height as the top face 9a or the top edge of the wiring part 9. For example, the protrusion 13 has a sectional shape such as semi-circular, semi-oval, trapezoidal, inverted-trapezoidal, triangular, or inverted-triangular section that maintains the height of the top face 23aa or the top edge of the protrusion 13 being the same as that of the top face 9a or the top edge of the wiring part 9. The flanges 23c may be omitted and accordingly the width of the base layer 19 may be reduced so that the protrusion 13 has a simple rectangular section.

The protrusion 13 may be wholly made of the same material as the base layer 19 with absence of the conductive layer 21 and the cover layer 23. Namely, the protrusion 13 may be a part of the base layer 19 so as to protrude from the top face of the base layer 19 and have the same height as the wiring part 9.

Figure 4:
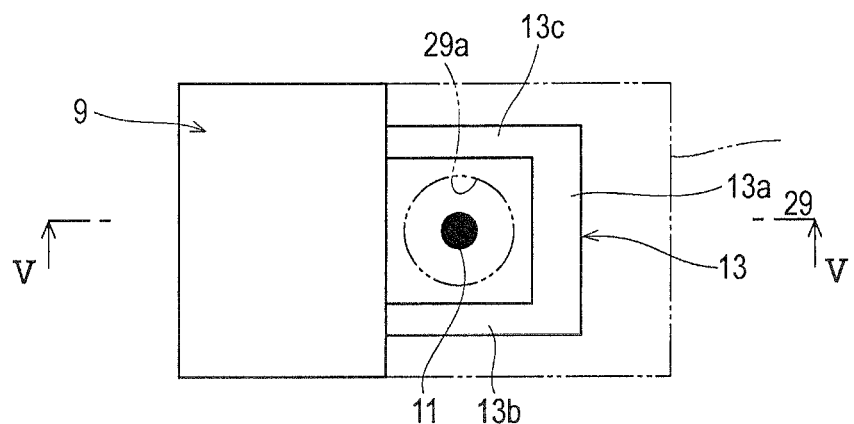
FIG. 4 is a schematic plan view partly illustrating the welded spot in the longitudinal middle of the flexure of the head suspension of FIG. 1 in relation to a welding jig.
Figure 5:
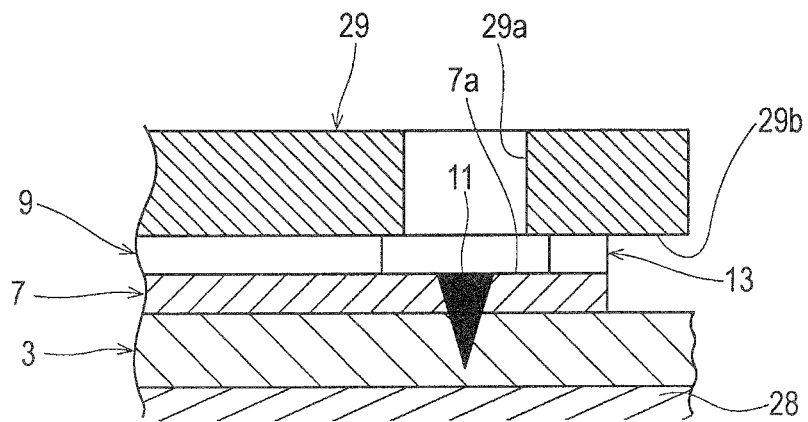
FIG. 5 is a sectional view taken along a line V-V of FIG. 4.

The method of welding the flexure 5 will be explained with reference to FIG. 4 and 5 in which FIG. 4 is a schematic plan view partly illustrating the welded spot 11 in the longitudinal middle of the flexure 5 of the head suspension 1 of FIG. 1 in relation to the welding jig 29 and FIG. 5 is a schematic sectional view taken along a line V-V of FIG. 4.

FIGS. 4 and 5 indicate only one welded spot 11 in one head suspension 1 that is one of head suspensions chained by a frame. When manufacturing the chained head suspensions, the flat welding jig holds down flexures 5 of semi-finished head suspensions around a plurality of scheduled portions to be welded all at once. Then, welded spots are formed by spot welding on the respective scheduled portions to form the chained head suspensions.

The method, before the welding, overlays the flexure 5 as the wiring thin plate and the load beam 3 and/or the base plate as the metal member one on another. In particular, the load beam 3 and the flexure 5 are put on a workbench 28 in this order to lay a part of flexure 5 on the load beam 3 as illustrated in FIG. 5. The base plate is also put on the workbench 28 while the base plate and the load beam 3 are partly laid on each other and another part of the flexure 5 is laid on the base plate like FIG. 28.

Then, the flat welding jig 29 is put on the stack of the load beam 3 (and the base plate) and the flexure 5, thereby to bring the flat face 29b of the welding jig 29 into contact with the wiring part 9 and the protrusion 13 so that the flat face 29b spans from the wiring part 9 to the protrusion 13. In particular, the flat face 29b simultaneously contacts with the top face 9a of the wiring part 9 and the top face 23aa of the protrusion 13 having the same height. The welding jig 29 is a flat plate having the flat face 29b. The welding jig 29, however, is enough to have the flat face 29b spanning from the wiring part 9 to the protrusion 13 and therefore may include irregularity on the other portion of the jig 29 excluding the flat face 29b.

The welding jig 29 has a through hole 29a that is provided for each one scheduled portion to be welded. The through hole 29a is positioned over and aligned with the corresponding scheduled portion when the flat face 29b of the welding jig 29 is brought into contact with the wiring part 9 and the protrusion 13.

Even if the welding jig 29 is deviated or shifted from the most appropriate position, the welding jig 29 keeps on hold-down the metal substrate 7 of the flexure 5 around the scheduled portion by applying load onto the wiring part 9 and the protrusion 13 as long as the flat face 29b spans from the wiring part 9 to the protrusion 13. Namely, the welding jig 29 surely applies the hold-down force to the metal substrate 7 or the flexure 5 around the scheduled portion through the wiring part 9 and the protrusion 13.

According to the embodiment, the welding jig 29 entirely holds down the projection 7a along the edge of the projection 7a of the metal substrate 7 of the flexure 5. This brings the projection 7a into close contact with the load beam 3 to which the projection 7a is welded.

In particular, since the protrusion 13 is continuous with the wiring part 9 and is continuously extended along the edge of the projection 7a, the protrusion 13 allows the projection 7a to be surely held down at the edge even if the projection 7a forms the thin single layer as well as the metal substrate 7 and has the wing shape.

Since the held-down projection 7a is circumferentially pressed through the wiring part 9 and the protrusion 13, the whole projection 7a including the scheduled portion surely close contacts with the load beam 3.

In this state, the scheduled portion is exposed outside through the through hole 29a of the welding jig 29 and then the spot welding is conducted to the scheduled portion through the through hole 29a to form the welded spot 11. With the welded spot 11, the metal substrate 7 or the flexure 5 is joined to the load beam 3. To the base plate, the metal substrate 7 or the flexure 5 may be joined in the same way as the above.

As mentioned above, the flexure 5 as the wiring thin plate according to the first embodiment includes the metal substrate 7, the insulating base layer 14 provided on the metal substrate 7, the wiring part 9 having the plurality of parallel wiring traces 15 provided on the insulating base layer 14, the scheduled portion defined on the metal substrate 7 to be welded for forming the welded spot 11 through which the metal substrate 7 is joined to the load beam 3 or the base plate (not illustrated) as a metal member, and the protrusion 13 formed on the metal substrate 7 for the scheduled portion and having the height that is the same as the height of the wiring part 9 to allow the flat face 29b of the welding jig 29 to be brought into contact with the protrusion 13 and the wiring part 9.

Accordingly, the metal substrate 7 of the flexure 5 is surely brought into close contact with the load beam 3 at the projections 7a and 7b for the scheduled portions when conducting the spot welding. Further, other scheduled portions (not illustrated) each including the protrusion 13 are surely brought into close contact with the load beam 3 or the base plate. This securely holds down the flexure 5 around the scheduled portions. With this, the embodiment obtains the welded spot 11 and the other welded spots with high quality.

According to the embodiment, the protrusion 13 is not the wiring part 9 but the dummy wiring part. If the protrusion 13 is formed as a part of the wiring part 9, this modified structure causes the following problems though it provides the aforementioned effect.

First, it is difficult to arrange wiring traces each having a widened width due to low impedance in a restricted area around a scheduled portion.

Only one narrow wiring trace such as read wiring trace may be arranged in the restricted area. This structure, however, deteriorates the electric characteristic.

Further, the right and left outer wiring traces frequently have different widths. If the right and left outer wiring traces are arranged around the respective scheduled portions, this breaks the right-left symmetry and deteriorates a dynamic characteristic of the head suspension.

In contrast, the first embodiment does not involve such problems. Further, the protrusion 13 is adjustable in size and the like when forming the protrusion 13.

According to the embodiment, the flexure 5 has the projection 7a and the protrusion 13 is continuously provided on a portion of the projection 7a surrounding the scheduled portion.

Thus, even if the head suspension 1 is downsized and/or involves the widen wiring traces 15 and the projection 7a is not enough to be held down for the related art, the embodiment surely brings the projection 7a into close contact with the load beam 3 using protrusion 13 to maintain the quality of the welded spot 11.

The protrusion 13 serves as a rib reinforcing the edge of the projection 7a to contribute the close contact of the projection 7a to the load beam 3.

The protrusion 13 is the dummy wiring part having the same sectional layered structure as the wiring part 9 and is easily formed simultaneously with the wiring part 9. Further, the protrusion 13 being the dummy wiring part has the width that is allowed to be freely set regardless of the actual wiring part 9.

If the protrusion 13 is entirely formed by the same material as the base layer 19 i.e. is the integrated part of the base layer 19, the protrusion 13 needs no conductive layer and no cover layer and has the simplified structure to further reduce the manufacturing cost.

The method of welding the flexure 5 as the wiring thin plate to the load beam 3 or the base plate as the metal member, includes the steps of overlaying the flexure 5 and the load beam 3 (and the base plate) one on another bringing the flat face 29*b* of the flat welding jig 29 into contact with the wiring part 9 and the protrusion 13 of the flexure 5 so that the flat face 29*b* spans from the wiring part 9 to the protrusion 13 and the through hole 29*a* of the welding jig 29 is aligned with the scheduled portion, and conducting spot welding to the scheduled portion through the through hole 29*a* to form the welded spot 11.

This method allows the projection 7*a* to be surely held down using the flat welding jig 29 without holding convex portions or poles that should be arranged on the portion surrounding the scheduled portion, thereby to contribute downsizing of the head suspension 1.

The present invention is applicable to a head suspension regardless of size. Namely, the present invention allows the flat welding jig to be used to sufficiently hold down the metal substrate 7 around the scheduled portion regardless of size of the head suspension 1.

The use of the flat welding jig 29 prevents the influence of the deviation or shift of the welding jig 29 on the close contact of the metal substrate 7 or the projection 7*a* to the load beam 3 and/or the base plate.

The projection 7*a* is held down through the protrusion 13 being the dummy wiring part to prevent scratches from being generated on the top face of the metal substrate 7.

The first to fourth modifications of the first embodiment will be explained with reference to FIGS. 6 to 9 that are plan views each illustrating the welded spot in the longitudinal middle of the flexure of the head suspension of FIG. 1. In FIGS. 6 to 9, only one projection (right projection) is indicated. Since the other projection (left projection) has the same structure, only the right projection and the right protrusion will be explained. The modifications are basically the same as the first embodiment and therefore the corresponding components are represented with the same reference numerals or the same reference numerals plus "A" to "D" to omit repetition of explanation.

As illustrated in FIGS. 6 to 9, the protrusion may be partly provided on a portion of the projection 7*a* surrounding the scheduled portion.

Figure 6:
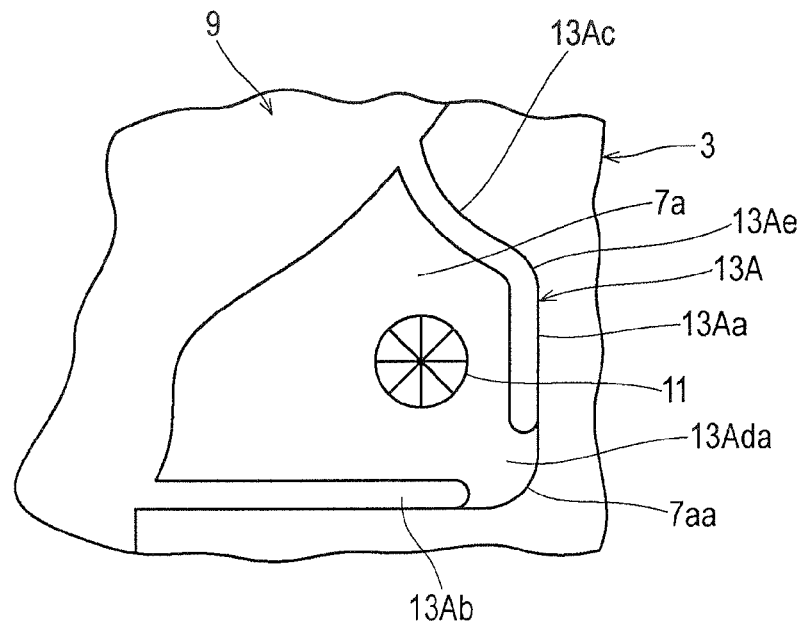
FIG. 6 is a plan view partly illustrating a welded spot in the longitudinal middle of the flexure of the head suspension of FIG. 1 according to a first modification of the first embodiment.

According to the first modification of FIG. 6, the protrusion 13A is provided with a cutout or gap 13Ada based on the protrusion 13 of the first embodiment. The gap 13Ada is located at the corner 7*aa* of the projection 7*a*. Namely the protrusion 13A is equivalent to the shape in which the first corner portion 13*d* of FIG. 2 is cut off from the protrusion 13. The ends of the first and second portions 13*a* and 13*b* facing the gap 13Ada is formed into a semi-circular shape without angles in the plan view.

The first modification, therefore, allows inert gas to be controlled by the gap 13Ada at the time of welding. Namely, the inert gas is introduced into a space between the welding jig 29 and the projection 7*a* to prevent welding burning of the projection 7*a* and then is discharged from the gap 13Ada for the control of the inert gas.

Figure 7:
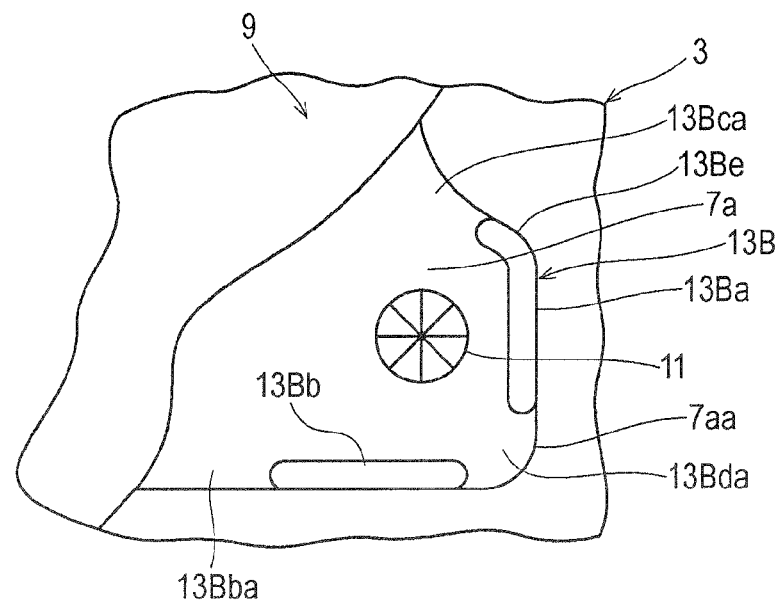
FIG. 7 is a plan view partly illustrating a welded spot in the longitudinal middle of the flexure of the head suspension of FIG. 1 according to a second modification of the first embodiment.

According to the second modification of FIG. 7, the protrusion 13B is provided with gaps 13Bba, 13Bca and 13Bda based on the protrusion 13 of the first embodiment. The gap 13Bda is located at the corner 7*aa* of the projection 7*a*. The gap 13Bba is formed between the second portion 13Bb of the protrusion 13B and the wiring past 9 by removing a part of the second portion 13*b* of the protrusion 13 of FIG. 2. The gap 13Bca is formed between the first portion 13Ba and the wiring part 9 by removing the third portion 13*c* of the protrusion 13 of FIG. 2.

The second modification, therefore, allows inert gas to be controlled by the gaps 13Bba, 13Bca and 13Bda at the time of welding. Namely, the gaps 13Bba, 13Bca and 13Bda discharge the inert gas introduced into the space between the welding jig 29 and the projection 7*a* to conduct the control of the inert gas.

Figure 8:
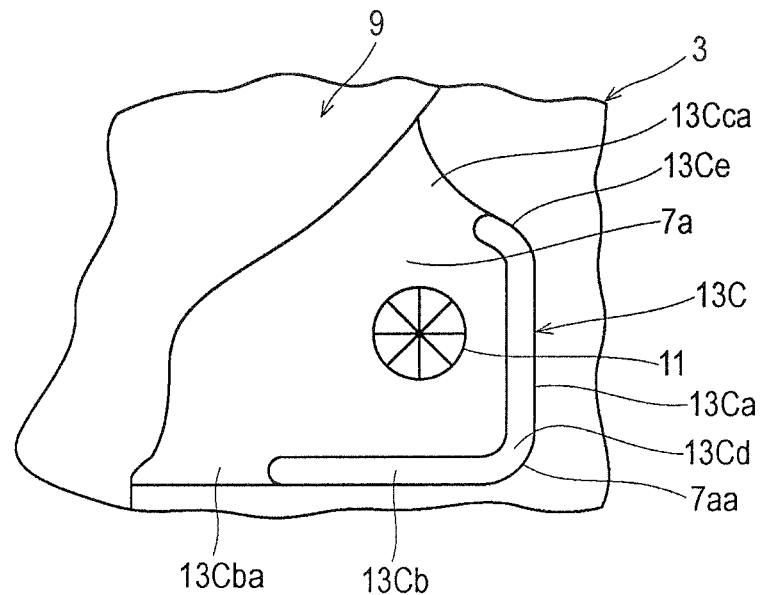
FIG. 8 is a plan view partly illustrating a welded spot in the longitudinal middle of the flexure of the head suspension of FIG. 1 according to a third modification of the first embodiment.

According to the third modification of FIG. 8, the protrusion 13C is provided with gaps 13Cba and 13Cca based on the protrusion 13 of the first embodiment. The gaps 13Cba and 13Cca are the same as the respective gaps 13Bca and 13Bca of FIG. 7.

The third modification, therefore, allows inert gas to be controlled by the gaps 13Cba and 13Cca at the time of welding.

Figure 9:
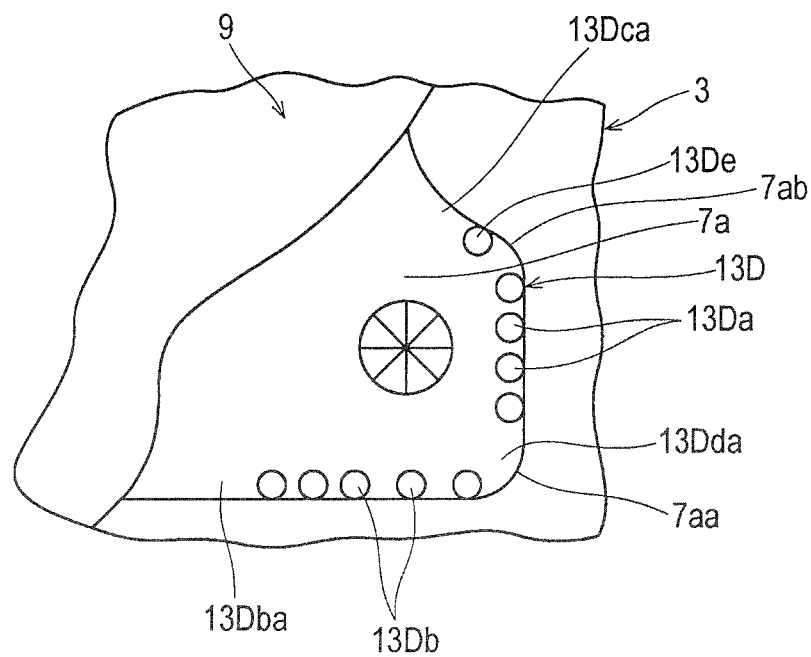
FIG. 9 is a plan view partly illustrating a welded spot in the longitudinal middle of the flexure of the head suspension of FIG. 1 according to a fourth modification of the first embodiment.

According to the fourth modification of FIG. 9, a plurality of discrete protrusions 13Da, 13Db and 13De are formed instead of the protrusion 13B of the second modification. Each protrusion has a circular cylindrical shape. The protrusions 13Da, 13Db and 13De are arranged in the region of the protrusion 13B in FIG. 7, in particular in the respective regions of the first portion 13Ba, the second portion 13Bb and the second corner portion 13Be of the protrusion 13B.

Intervals between adjacent protrusions are not uniform. In the set of the protrusions 13Db, the intervals closer to the corner portion 7*aa* of the projection 7*a* are relatively wide. In the set of the protrusions 13Da, the intervals are relative narrow. One of the protrusions 13Db closest to the corner portion 7*aa* is positioned at the one end of the corner portion 7*aa* and one of the protrusions 13Da closest to the corner portion 7*aa* is positioned slightly away from the other end of the corner portion 7*aa*. Another one of the protrusions 13Da closest to the corner portion 7*ab* of the projection 7*a* is positioned on the one end of the corner portion 7*ab* and the protrusion 13De is positioned at the other end of the corner portion 7*ab*. The interval between the protrusion 13De and the adjacent protrusion 13Da is relatively wide.

The fourth modification, therefore, allows inert gas to be controlled by the intervals between the adjacent protrusions and the gaps 13Dba, 13Dca and 13Dda at the time of welding.

The intervals between the adjacent protrusions are optional and may be changed according to the control of the inert gas. The protrusions 13D are formed instead of the protrusion 13, 13A or 13C and accordingly arranged in the region of the protrusion 13, 13A or 13C.

The first embodiment including the first to fourth modifications is applicable to the other welded spot or scheduled portion of the flexure 5 for welding the flexure 5 to the load beam 3 and/or the base plate. The protrusion may be formed for some selected welded spots or scheduled portions. In this case, the welding jig may be provided with the holding convex portion of the related art for the welded spot or scheduled portion for which the protrusion is not formed.

Figure 10:
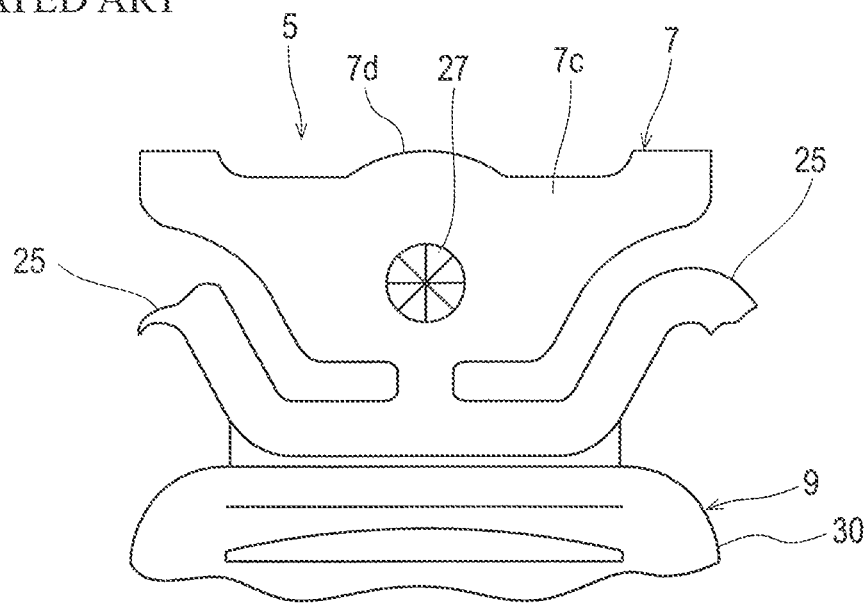
FIG. 10 is a plan view partly illustrating a front end portion of a flexure around a welded spot according to a comparative example.
Figure 11:
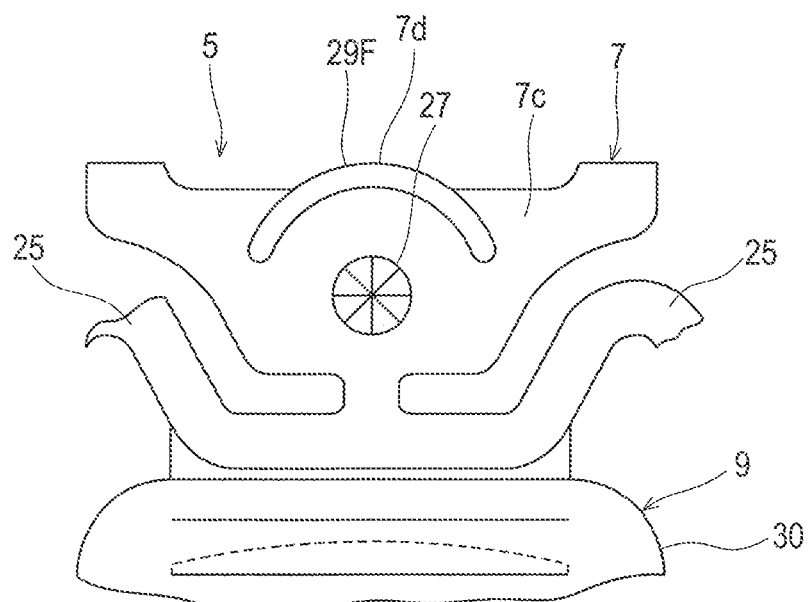
FIG. 11 is a plan view partly illustrating a front end portion of a flexure around a welded spot according to a second embodiment of the present invention.

The second embodiment will be explained. FIG. 10 is a plan view partly illustrating a front end portion of a flexure around a welded spot according to a comparative example and FIG. 11 is a plan view partly illustrating a front end portion of a flexure around a welded spot according to the second embodiment of the present invention. In the second embodiment, components corresponding to those of the first embodiment are represented with the same reference numerals or the same reference numerals plus "F" to omit repetition of explanation.

As the comparative example illustrated in FIG. 10, the head suspension includes the head. In the head, the metal substrate 7 at a front end portion thereof is provided with the tongue 30 onto which the slider (FIG. 28) is attached. The slider includes the read/write elements to which the wiring traces of the wiring part 9 are electrically connected. The wiring part 9 is schematically illustrated in FIG. 10. The wiring part 9 has the same sectional layered structure as the wiring part 9 of FIG. 3.

Figure 28:
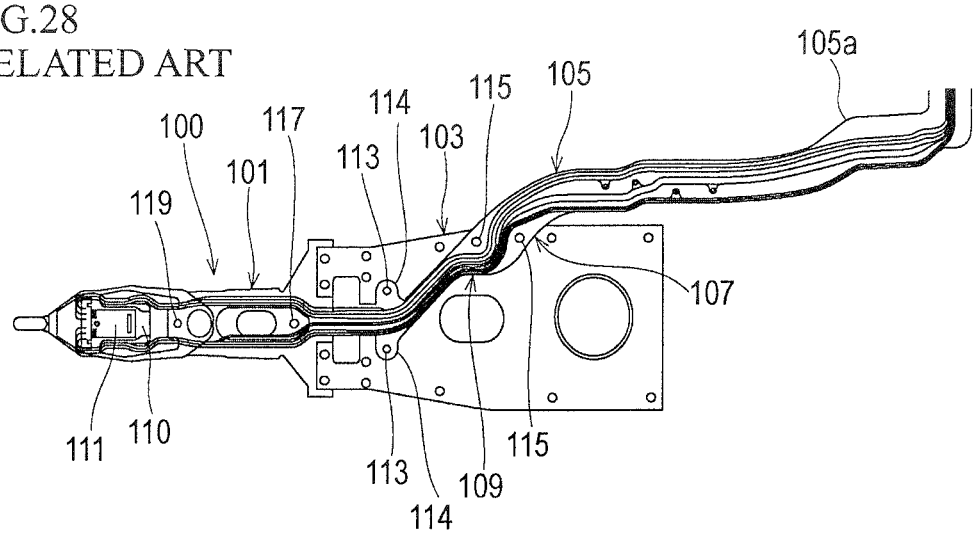
FIG. 28 is a plan view illustrating a head suspension to which a flexure is attached according to a related art.
Figure 29:
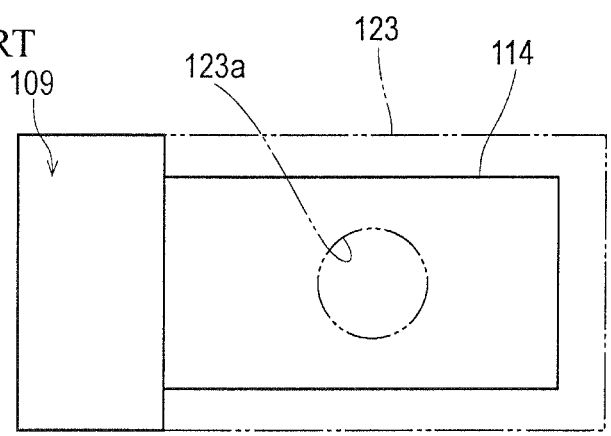
FIG. 29 is a plan view partly illustrating one of welded spots of the head suspension of FIG. 28.
Figure 30:
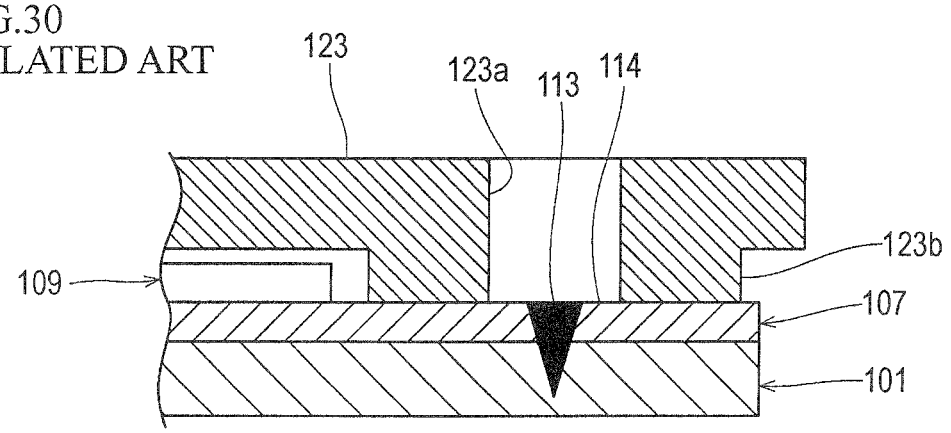
FIG. 30 is a sectional view partly illustrating the welded spot of FIG. 29 in relation to a welding jig.
Figure 31:
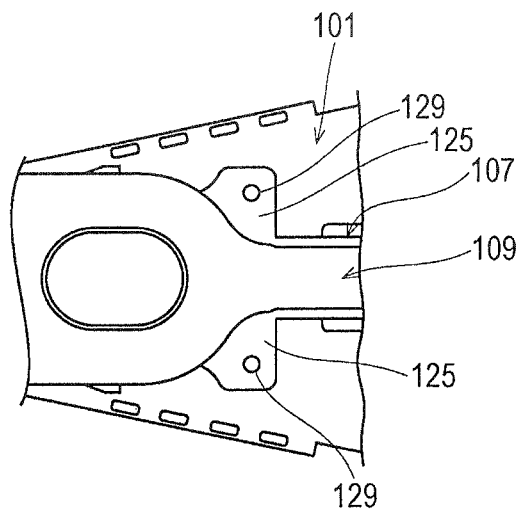
FIG. 31 is a plan view partly illustrating a small head suspension to which a flexure is attached according to another related art.
Figure 32:
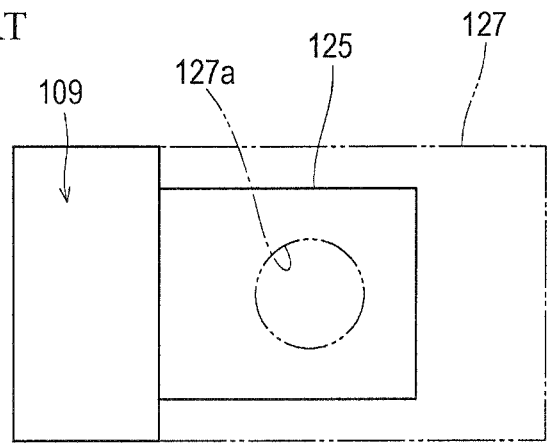
FIG. 32 is a plan view partly illustrating a welded spot of the head suspension of FIG. 31 in relation to a welding jig.
Figure 33:
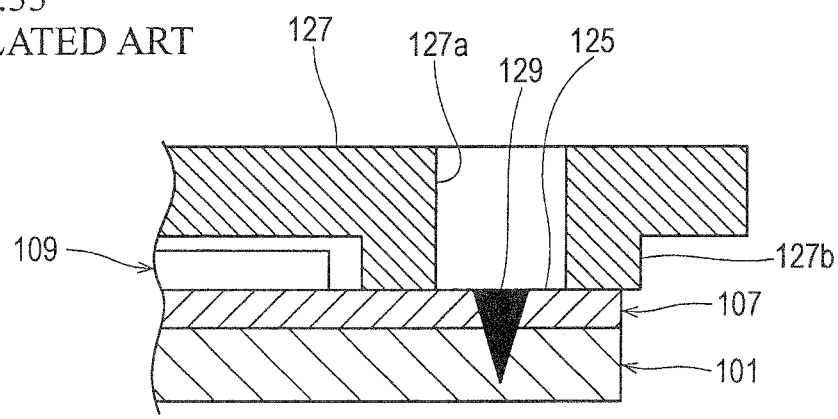
FIG. 33 is a plan view partly illustrating the welded portion of FIG. 32 in relation to the welding jig.

The metal substrate 7 has a front projection 7c longitudinally forward protruding relative to the right and left outriggers 25 and therefore the tongue 30. On the front projection 7c, a welded spot 27 is formed to join the metal substrate 7 and the front end of the load beam (FIG. 28).

Based on the comparative example, the second embodiment of FIG. 11 is provided with a protrusion 29F. The protrusion 29F is formed on a portion of the front projection 7c surrounding the scheduled portion to be welded. According to the embodiment, the front projection 7c has an edge 7d in the center of the right-left direction. The edge 7d has a forward convex arc shape. Onto the edge 7d, the protrusion 29F is formed. With this, the protrusion 29F has an arc shape with the center of curvature located onto the center of the welded spot 27 in the plan view and circumferentially partly surrounds the welded spot 27 on a front side thereof at a distance. The protrusion 29F is symmetrically arranged across the welded spot 27 or the scheduled portion in the sway direction or the right-left direction of the head suspension 1. Right and left ends of the protrusion 29F are out of the edge 7d and led to a main portion of the front projection 7c.

The metal substrate 7 has one or more bends in a pitching direction around the front projection 7c and the front projection 7c is a portion having no influence of such bends.

The protrusion 29F has the same sectional structure as the protrusions 13 of the first embodiment so that the height of the protrusion 29F is the same as that of the wiring part 9. The heights of the protrusion 29F and the wiring part 9 are measured from the top faces of specified regions of the metal substrate 7 on which the protrusion 29F and the wiring part 9 are located to the top faces of the protrusion 29F and the wiring part 9, respectively.

When conducting welding, the flat face 29b of the flat welding jig 29 (FIG. 5) spans from the wiring part 9 to the protrusion 29F to press the same. Thus, the second embodiment securely holds down the front projection 7c including the scheduled portion on the front end portion of the load beam 3 and therefore securely forms the welded spot 27 in comparison with the comparative example of FIG. 10. Further, the protrusion 29F reinforces the edge 7d of the front projection 7c of the metal substrate 7.

Figure 12:
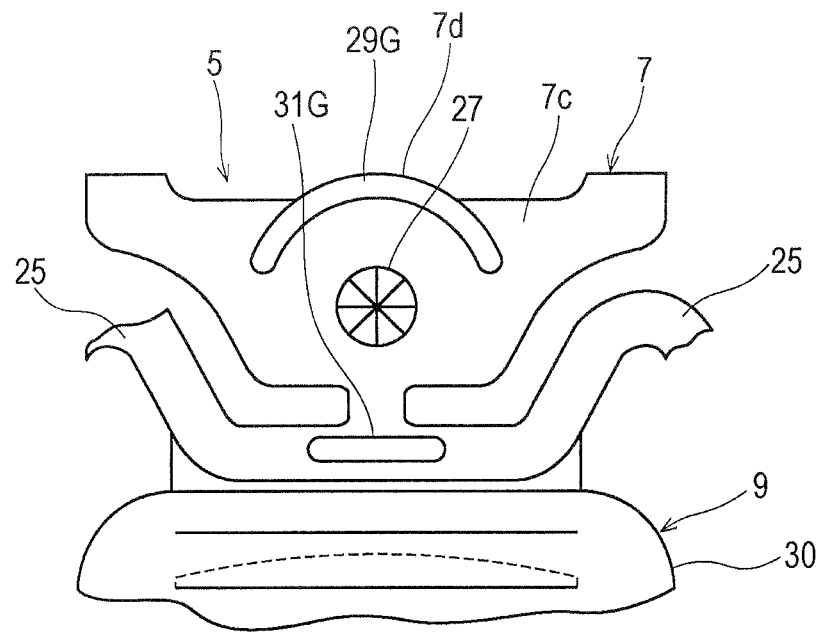
FIG. 12 is a plan view partly illustrating a front end portion of a flexure around a welded spot according to a first modification of the second embodiment.
Figure 13:
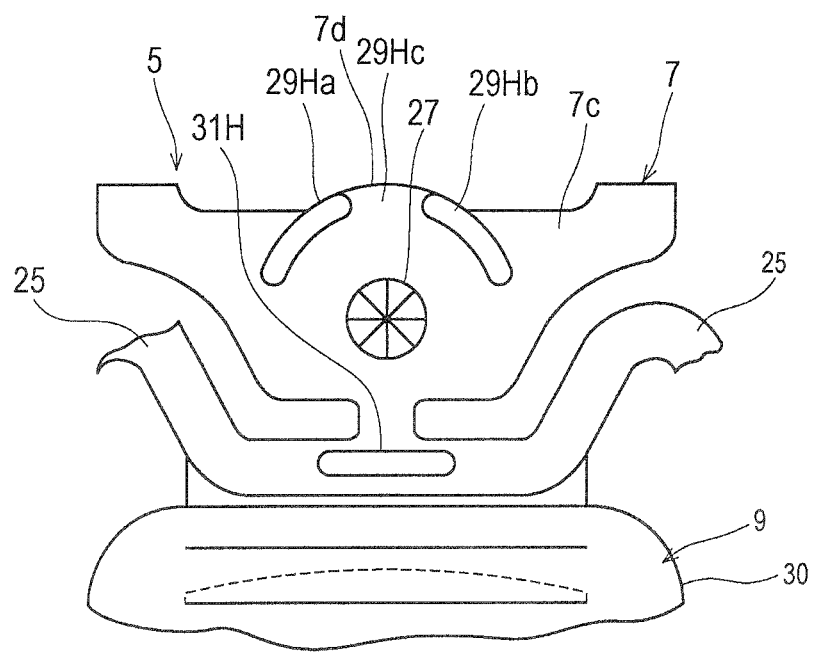
FIG. 13 is a plan view partly illustrating a front end portion of a flexure around a welded spot according to a second modification of the second embodiment.
Figure 14:
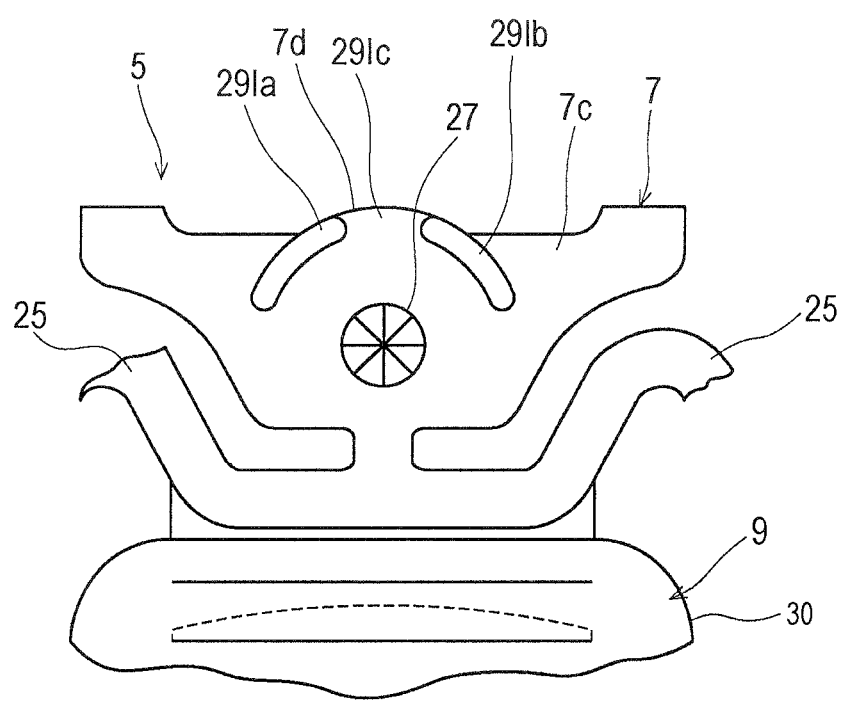
FIG. 14 is a plan view partly illustrating a front end portion of a flexure around a welded spot according to a third modification of the second embodiment.

FIGS. 12 to 14 are plan views illustrating the first to third modifications of the second embodiment. The modifications are basically the same as the second embodiment and therefore the corresponding components are represented with the same reference numerals or the same reference numerals plus "G" to "I" to omit repetition of explanation.

The first to third modifications form a protrusion onto each one of the edge 7d of the front projection 7c and a portion between the scheduled portion and the wiring part 9.

The first modification of FIG. 12 has the discrete protrusions 29G and 31G. The protrusion 29G is the same as the protrusion 29F of FIG. 11. The protrusion 31G is arranged on a rear side of the welded spot 27 to face the projection 29F across the welded spot 27 and is next to the wiring part 9 in the front-read direction. The protrusion 31G has a straight shape extending in the right-left direction in the plan view. The protrusion 31G has the same sectional layered structure as the protrusion 29G to have the same height.

When conducting welding, the flat face 29b of the flat welding jig 29 spans from the wiring part 9 and the protrusions 29G and 31G to press the same. Thus, the first modification securely forms the welded spot 27 in comparison with the comparative example of FIG. 10.

The second modification of FIG. 13 has the discrete protrusions 29Ha, 29Hb and 31H. The protrusions 29Ha and 29Hb are formed instead of the protrusion 29G of FIG. 12 and the protrusion 31H is the same as the protrusion 31G of FIG. 12.

The protrusions 29Ha and 29Hb are separated by a gap 29Hc arranged on a center based on the protrusion 29G of FIG. 12.

The second modification, therefore, easily controls with the presence of gap 29Hc the inert gas to avoid welding burning in comparison with the first modification of FIG. 12.

The third modification of FIG. 14 is equivalent to the structure in which the protrusion 31H of FIG. 13 is omitted in the second modification. Namely, the third modification has the protrusions 29Ia and 29Ib and the gap 29Ic that are the same as the 29Ha and 29Hb and the gap 29Hc of FIG. 13, respectively.

Figure 15:
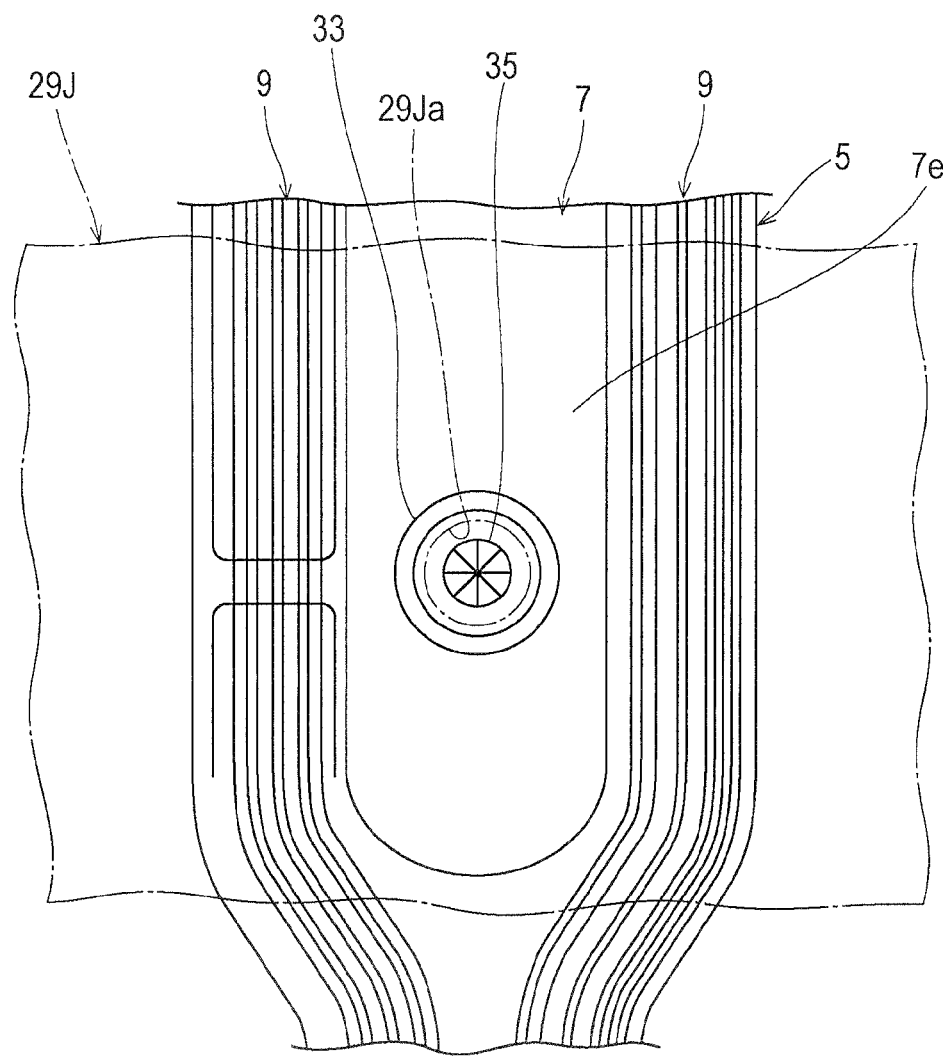
FIG. 15 is a plan view partly illustrating a welded spot in the longitudinal middle of a flexure of a head suspension according to a third embodiment of the present invention.
Figure 16:
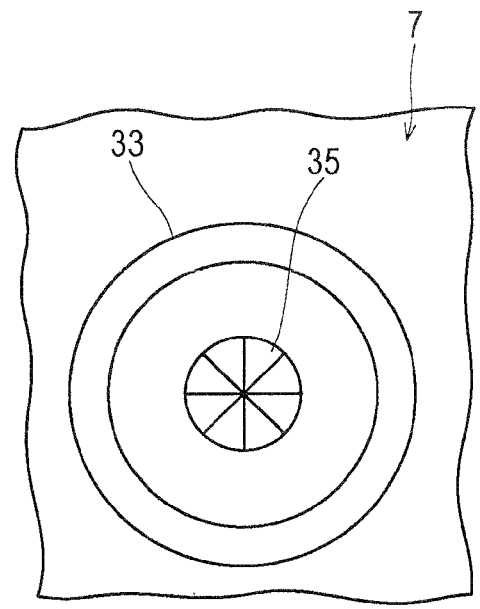
FIG. 16 is a plan view illustrating a protrusion around the welded spot of FIG. 15.
Figure 17:
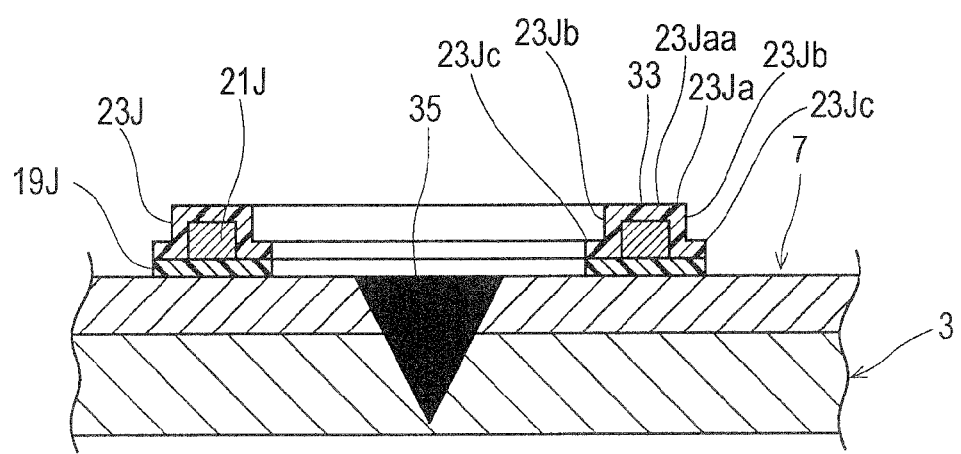
FIG. 17 is a sectional view illustrating the protrusion around the welded spot of FIG. 15.

The third embodiment will be explained. FIG. 15 is a plan view partly illustrating a welded spot in the longitudinal middle of a flexure of a head suspension according to the third embodiment of the present invention. FIG. 16 is a plan view partly illustrating a protrusion around the welded spot of FIG. 15, and FIG. 17 is a sectional view partly illustrating the protrusion around the welded spot of FIG. 15. In the third embodiment, components corresponding to those of the first or second embodiment are represented with the same reference numerals or the same reference numerals plus "J" to omit repetition of explanation.

According to the third embodiment, the welded spot or scheduled portion is arranged on an intervening portion of the metal substrate 7 between the wiring traces of the wiring part 9. The third embodiment is applicable regardless of size in a wiring interval between the adjacent wiring traces.

As illustrated in FIGS. 15 and 16, the wiring traces of the wiring part 9 are branched into a fork to expose the intervening portion 7e of the metal substrate 7. On the intervening portion 7e, the welded spot 35 is formed. According to the embodiment, the flexure 5 has the protrusion 33 circumferentially continuously provided on a part of the intervening portion 7e surrounding the scheduled portion to be welded spot 35 at a distance. The protrusion 33 has the same height as the wiring part 9.

The protrusion 33 of the present embodiment has a circular annular or ring shape that encircles the welded spot 35 in the plan view. An inner diameter of the protrusion 33 is slightly larger than that of the through hole 29Ja of the welding jig 29J.

As illustrated in FIG. 17, the sectional layered structure of the protrusion 33 is the same as that of the wiring part 9 on each side of the protrusion 33 in the right-left direction. Namely, the protrusion 33 has the base layer 19J, the conductive layer 21J and the cover layer 23J equivalent to the base layer 19, the conductive layer 21 and the cover layer 23 of the protrusion 13 of FIG. 3. The base layer 19J has the circular annular or ring shape with a constant radial width and the conductive layer 21l is formed on the base layer 19J to have a circular or ring shape with a narrower radial width than the base layer 19J. The cover layer 23J includes the top wall 23Ja, the side walls 23Jb and the flanges 23Jc. The flat top face of the top wall 23Ja is positioned at the same height as the top face 9a of wiring part 9 on each side of the protrusion 33 in the right-left direction.

The protrusion 33 may have a different sectional shape like the protrusion 13 of the first embodiment. The protrusion 33 may be wholly made of the same material as the base layer 19J in the same way as the protrusion 13. The width of the protrusion 33 is not necessarily constant in the whole circumference and may be partly changed or have a radially inward or outward convex portion. These may be also applied to the following modifications of the third embodiment.

According to the third embodiment, the flat face 29Ja of the flat welding jig 29J spans from the wiring part 9 to the protrusion 33 to apply load onto the same to hold down the metal substrate 7 around the scheduled portion, thereby to precisely apply the hold-down force to the metal substrate 7 or flexure 5 around the scheduled portion through the wiring part 9 and the protrusion 33. The circular annular shape of the protrusion 33 serves as the mark for positioning the through hole 29Ja of the welding jig 29J.

The protrusion 33 has the circular annular shape that encircles the scheduled portion in the plan view and therefore the metal substrate 7 is held down in a region that encircles the scheduled portion. This more precisely applies the hold-down force to the metal substrate 7 around the scheduled portion.

FIGS. 18 to 27 are plan views illustrating the first to tenth modifications of the third embodiment. The modifications are basically the same as the third embodiment and therefore the corresponding components are represented with the same reference numerals or the same reference numerals plus "K" to "U" to omit repetition of explanation.

The first to tenth modifications form protrusions circumferentially partly or discontinuously provided on a part of the intervening portion 7e surrounding the scheduled portion. The protrusions are symmetrically arranged in the front-rear direction and the right-left direction.

Figure 18:
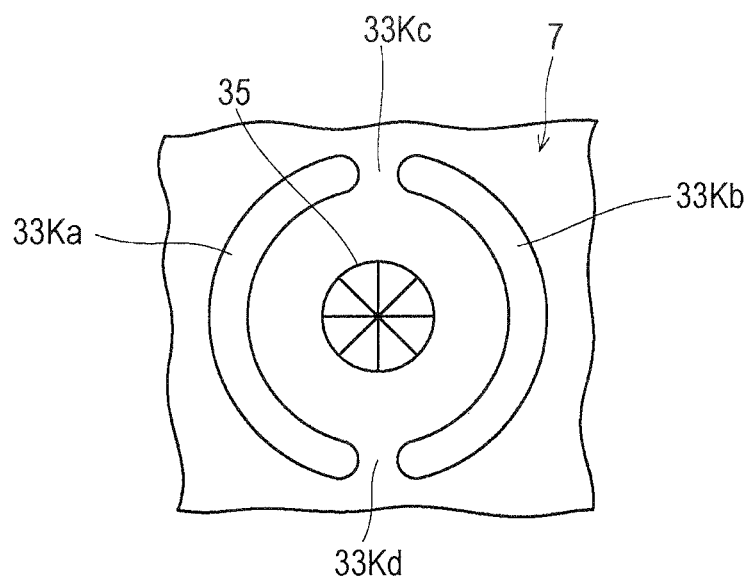
FIG. 18 is a plan view illustrating protrusions around the welded spot according to a first modification of the third embodiment.

The first modification of FIG. 18 forms gaps 33Kc and 33Kd based on the protrusion 33 of FIG. 16 to have the right and left protrusions 33Ka and 33Kb separated by the gaps 33Kc and 33Kd interposed therebetween. The protrusions 33Ka and 33Kb are symmetric in the front-rear direction and the right-left direction. The gaps 33Kc and 33Kd are arranged on respective sides in the front-rear direction or the longitudinal direction of the flexure 5 in the region between the right and left protrusions 33Ka and 33Kb, to keep the balance in the right-left direction.

The first modification easily controls the inert gas to avoid welding burning with the presence of the gaps 33Kc and 33Kd in comparison with the third embodiment of FIG. 16.

Figure 19:
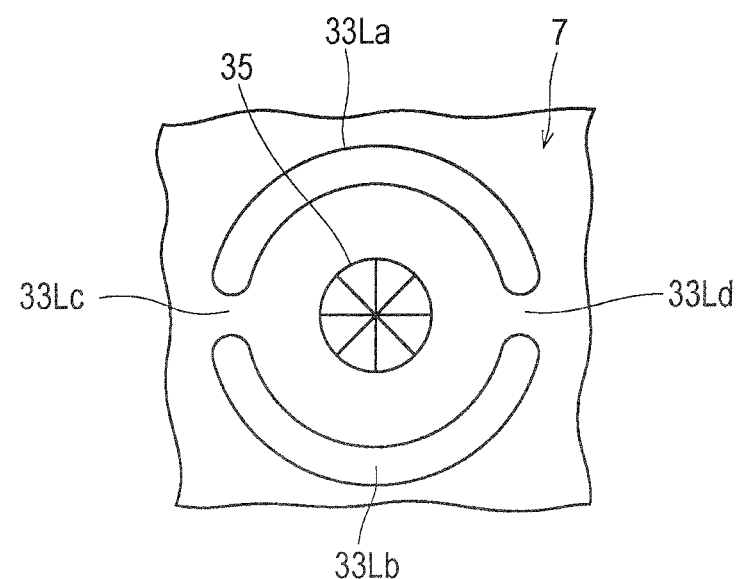
FIG. 19 is a plan view illustrating protrusions around the welded spot according to a second modification of the third embodiment.

The second modification of FIG. 19 forms gaps 33Lc and 33Ld based on the protrusion 33 of FIG. 16 to have the front and rear protrusions 33La and 33Lb separated by the gaps 33Lc and 33Ld interposed therebetween. The protrusions 33La and 33Lb are symmetric in the front-rear direction and the right-left direction. The gaps 33Lc and 33Ld are arranged on respective sides in the right-left direction of the flexure 5 in the region between the front and rear protrusions 33La and 33Lb, to keep the balance in the front and rear direction.

The second modification easily controls the inert gas to avoid welding burning with the presence of the gaps 33Lc and 33Ld in comparison with the third embodiment of FIG. 16.

Figure 20:
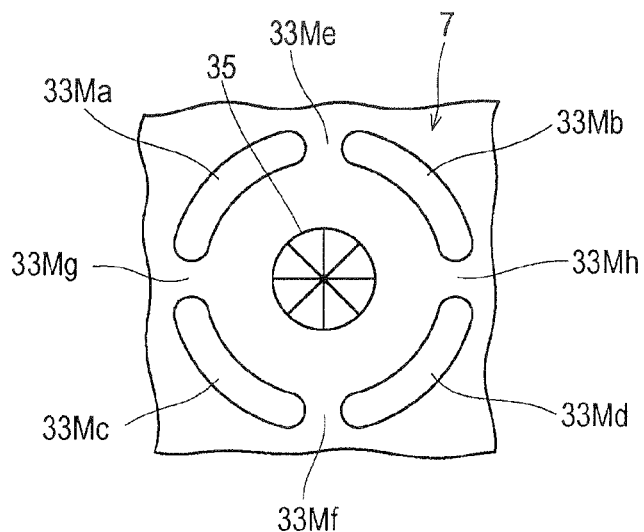
FIG. 20 is a plan view illustrating protrusions around the welded spot according to a third modification of the third embodiment.

The third modification of FIG. 20 is a combination of the first and second modifications of FIGS. 18 and 19. Namely, the third modification forms gaps 33Me, 33Mf, 33Mg and 33Mh based on the protrusion 33 of FIG. 16 to have the protrusions 33Ma, 33Mb, 33Mc and 33Md separated by the gaps 33Me, 33Mf, 33Mg and 33Mh. The protrusions 33Ma, 33Mb, 33Mc and 33Me are symmetric in the front-rear direction and the right-left direction.

The gaps 33Me, 33Mf, 33Mg and 33Mh are arranged between the respective interspaces between the adjacent ones of the protrusions 33Ma, 33Mb, 33Mc and 33Md so as to be symmetric in the front-rear direction and the right-left direction, to keep the balance in the front-rear direction and the right-left direction.

The third modification easily controls the inert gas to avoid welding burning with the presence of the gaps 33Me, 33Mf, 33Mg and 33Mh in comparison with the third embodiment of FIG. 16.

Figure 21A:
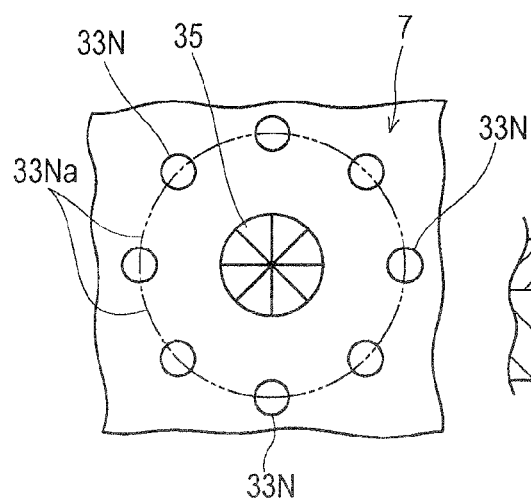
FIG. 21A is a plan view illustrating protrusions around the welded spot according to a fourth modification of the third embodiment.
Figure 21B:
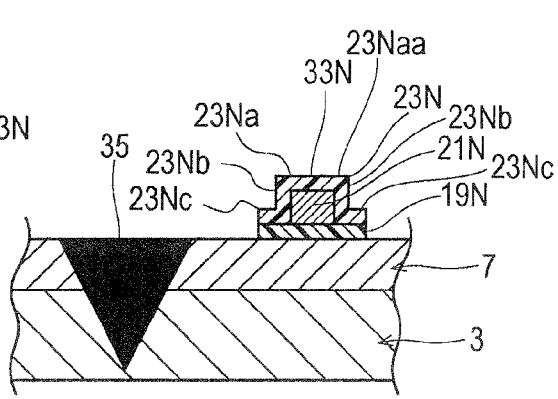
FIG. 21B is a sectional view illustrating one of the protrusions of FIG. 21A around the welded spot.

The fourth modification of FIG. 21 circumferentially arranges a plurality of discrete protrusions 33N around the welded spot 35 at regular intervals. Use protrusions 33N form a circular annular shape as a whole. The circular annular shape of the protrusions 33N corresponds to the protrusion 33 of FIG. 16. The adjacent protrusions 33N define a gap 33Na therebetween.

The sectional layered structure of each one protrusion 33N is the same as that of the wiring part 9 on each side of the protrusion 33N in the right and left direction. Namely, the protrusion 33N includes the base layer 19N, the conductive layer 21N and the cover layer 23N similar to the base layer 19, the conductive layer 21 and the cover layer 23 of the protrusion 13 of FIG. 3.

According to the fourth modification, the base layer 19N has a circular planar shape and the conductive layer 21N has a circular planar shape and is formed on the base layer 19N. The cover layer 23N has the top wall 23Na, the side wall 23Nb and the flange 23Nc so as to cover the conductive layer 21N. The flat top face 23Naa of the top wall 23Na is positioned at the same height as the flat top face 9a of the wiring part 9.

The protrusion 33N may have a different sectional shape like the protrusion 13 of the first embodiment. The protrusion 33N may be wholly made of the same material as the base layer 19N in the same way as the protrusion 13. The planar shape of the protrusion 33N is not limited to the circular shape and may employ a different shape such as oval, square, triangular, or rhombic shape. These may be also applied to the other modifications having the similar protrusion.

According to the fourth modification, the flat face 29b of the flat welding jig 29 spans from the wiring part 9 to the protrusions 33N to apply load onto the same to hold down the metal substrate 7 around the scheduled portion, thereby to precisely apply the hold-down force to the metal substrate 7 around the scheduled portion through the wiring part 9 and the protrusions 33N.

In particular, the discrete protrusions 33N independently apply the hold-down force to the metal substrate 7 at respective points to allow the welded spot 35 to be precisely formed and the inert gas to be easily controlled through the gaps 33Na.

Figure 22:
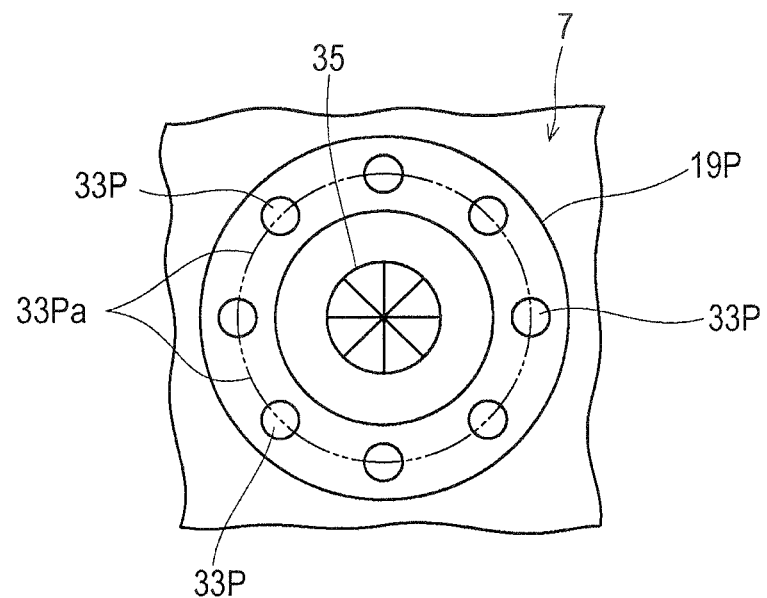
FIG. 22 is a plan view illustrating protrusions around the welded spot according to a fifth modification of the third embodiment.

The fifth modification of FIG. 22 circumferentially arranges a plurality of discrete protrusions 33P around the welded spot 35 at regular intervals so that the protrusions 33P form a circular annular shape as a whole. The protrusions 33P are located on the positions of the protrusions 33N of FIG. 21, respectively. The adjacent protrusions 33P define a gap 33Pa therebetween.

The planer shape of each one protrusion 33P is circular and the sectional layered structure of each one protrusion 33P is the same as that of the protrusion 33N of FIG. 21 except for the base layer 19R. The base layer 19P is a circular annular shape to continuously extend over the protrusions 33P.

According to the fifth modification, the protrusions 33P receive the hold-down force from the flat face 29b of the flat welding jig 29 at the time of the welding and transmit the received hold-down force through the base layer 19P to the metal substrate 7 around the scheduled portion. This results in precisely forming the welded spot 35. Further, the fifth modification easily controls the inert gas through the gaps 33Pa. The base layer being the circular annular shape to continuously extend over the protrusions is applicable to the other modifications in the same way as the fifth modification.

Figure 23:
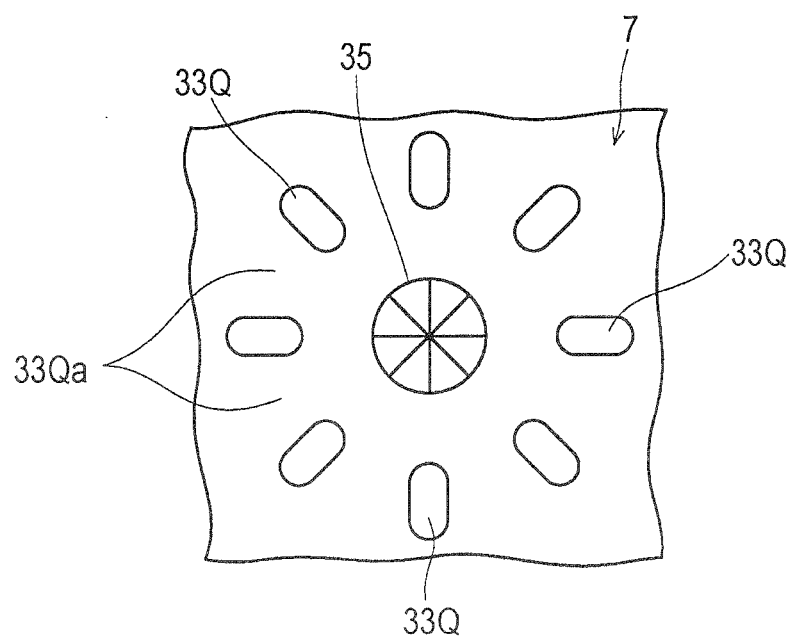
FIG. 23 is a plan view illustrating protrusions around the welded spot according to a sixth modification of the third embodiment.

The sixth modification of FIG. 23 is based on the fourth modification of FIG. 21 and is provided with the protrusions 33Q having a linear planar shape instead of the protrusions 33N having the circular planar shape. The protrusions 33Q linearly extend in a radial direction and have radial ends with a semi-circular planar shape. Use protrusions 33Q are circumferentially arranged around the welded spot 35 at regular intervals like the fourth modification. The protrusions 33Q form a circular annular shape as a whole. The adjacent protrusions 33Q define a gap 33Qa therebetween.

According to the sixth modification, the protrusions 33Q receive the hold-down force from the flat face 29b of the flat welding jig 29 at the time of the welding and press radially-elongated regions of the metal substrate 7 around the scheduled portion. This results in precisely forming the welded spot 35. Further, the sixth modification easily controls the inert gas through the gaps 33Qa.

Figure 24:
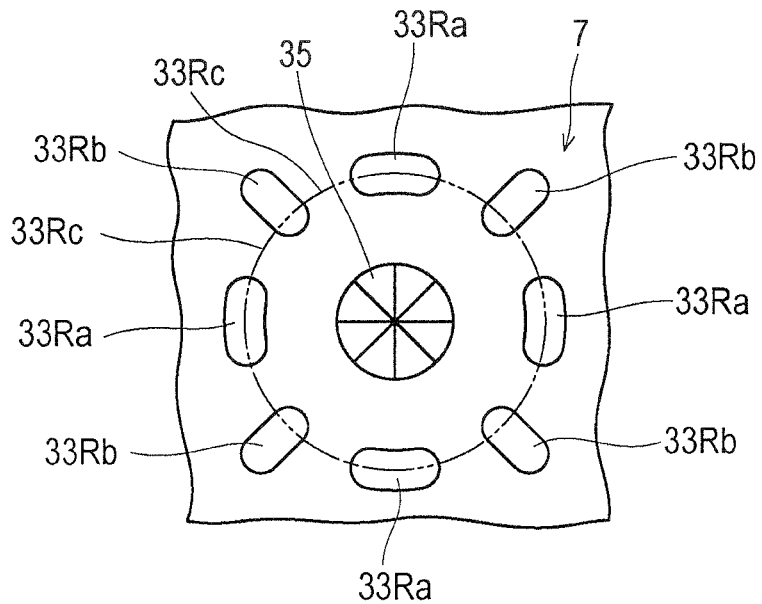
FIG. 24 is a plan view illustrating protrusions around the welded spot according to a seventh modification of the third embodiment.

The seventh modification of FIG. 24 is based on the sixth modification of FIG. 23 and is provided with protrusions 33Ra and 33Rb alternated with each other in the circumferential direction. The protrusions 33Ra face each other across the welded spot 35 in the front-rear direction or the right-left direction, are arranged on an annular circular region surrounding the welded spot 35 and are elongated in the circumferential direction to have an arc planar shape. The protrusions 33Rb correspond to the protrusions 33Q of FIG. 23. The adjacent protrusions 33Ra and 33Rb define a gap 33Rc therebetween.

According to the seventh modification, the protrusions 33Ra increase the circumferential continuity of the hold-down force in comparison with the sixth modification. The seventh modification changes the control of the inert gas with the gap 33Rc.

Figure 25:
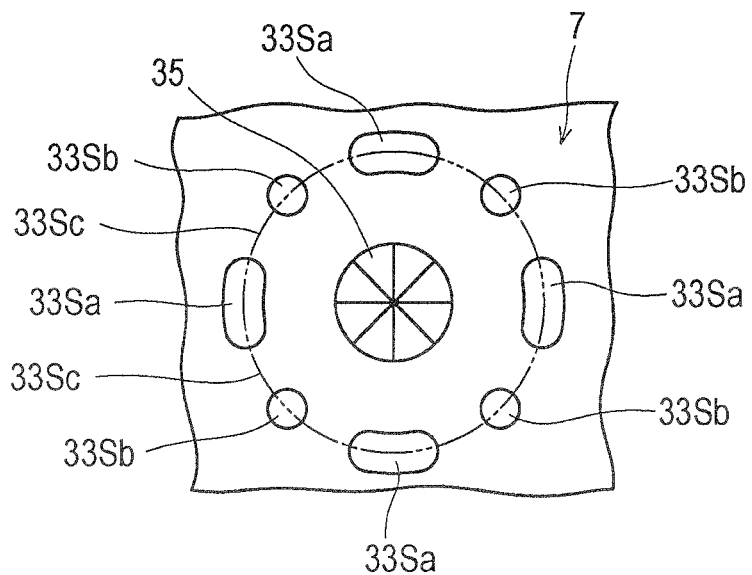
FIG. 25 is a plan view illustrating protrusions around the welded spot according to an eighth modification of the third embodiment.

The eighth modification of FIG. 25 is based on the seventh modification of FIG. 24 and is provided with protrusions 33Sa and 33Sb alternated with each other in the circumferential direction. The protrusions 33Sb face each other across the welded spot 35 in the left oblique or right oblique directions and have a circular planar shape like the protrusion 33N of FIG. 21. The protrusions 33Sa correspond to the protrusions 33Ra of FIG. 24. The adjacent protrusions 33Sa and 33Sb define a gap 33Sc therebetween.

According to the eighth modification, each one protrusion 33Sb applies the hold-down force to the metal substrate 7 at a circumferential point between the circumferentially-elongated protrusions 33Sa in comparison with the seventh modification.

Figure 26:
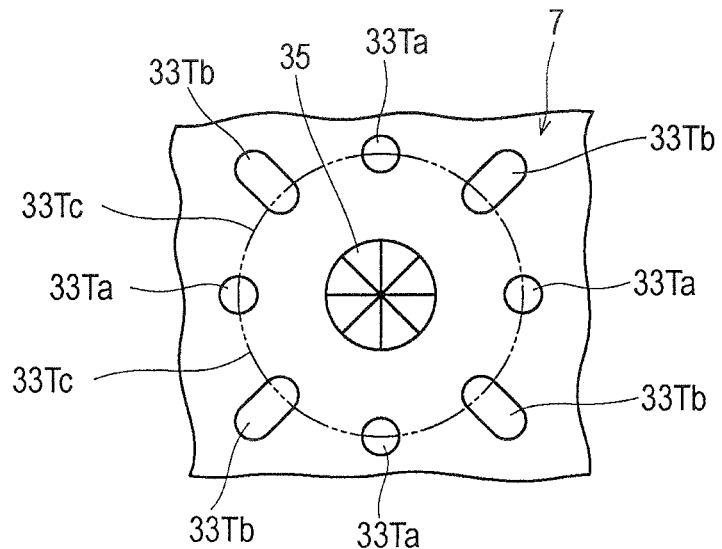
FIG. 26 is a plan view illustrating protrusions around the welded spot according to a ninth modification of the third embodiment.

The ninth modification of FIG. 26 is based on the sixth modification of FIG. 23 and is provided with protrusions 33Ta and 33Tb alternated with each other in the circumferential direction. The protrusions 33Ta face each other across the welded spot 35 in the front-rear or right-left directions and have a circular planar shape like the protrusion 33N of FIG. 21. The protrusions 33Tb correspond to the protrusions 33Q of FIG. 23. The adjacent protrusions 33Ta and 33Tb define a gap 33Tc therebetween.

According to the ninth modification, each one protrusion 33Ta applies the hold-down force to the metal substrate 7 at a circumferential point between the radially-elongated protrusions 33Tb in comparison with the sixth modification.

Figure 27:
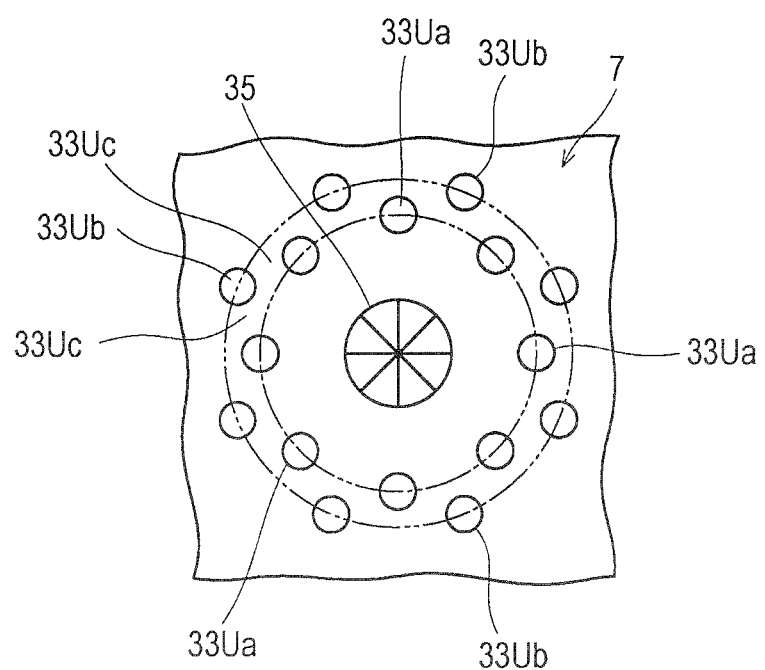
FIG. 27 is a plan view illustrating protrusions around the welded spot according to a tenth modification of the third embodiment.

The tenth modification of FIG. 27 is based on the fourth modification of FIG. 21 and is provided with protrusions 33Ua and 33Ub. The protrusions 33Ua are circumferentially arranged at regular intervals so as to outline an inner circumference around the welded spot 35 and the protrusions 33Ub are circumferentially arranged at regular intervals so as to outline an outer circumference concentric with the inner circumference. The protrusions 33Ua are the same as the protrusions 33N of FIG. 21. The protrusions 33Ub have the same planar shape as the protrusions 33N and are shifted outward in the radial direction relative to the protrusions 33Ua. Each one protrusion 33Ub is arranged circumferentially between the adjacent protrusions 33Ua. The adjacent protrusions 33Ua and the adjacent protrusions 33Ub define a gap 33Uc therebetween.

According to the tenth modification, the protrusions 33Ua and the protrusions 33Ub apply the hold-down force to the metal substrate 7 at double radially inner and outer points. The tenth modification changes the control of the inert gas with the gap 33Uc.

What is claimed is:

1. A wiring thin plate comprising:
    a supporting layer made of metal;
    an insulating layer provided on the supporting layer;
    a wiring part having a plurality of wiring traces provided on the insulating layer;
    a scheduled portion defined on the supporting layer to be welded for forming a welded spot through which the supporting layer is joined to a metal member; and
    a protrusion formed on the supporting layer to assist during a welding process of the scheduled portion to the metal member and having a height that is the same as a height of the wiring part.

2. The wiring thin plate according to claim 1
    wherein the supporting layer further has a projection that protrudes outward from the wiring part and the scheduled portion is defined on the projection, and
    wherein the projection surrounds the scheduled portion and the protrusion is continuously or partly provided on a portion of the projection.

3. The wiring thin plate according to claim 1,
    wherein the supporting layer further has an intervening portion that is exposed between the wiring traces of the wiring part and the scheduled portion is defined on the intervening portion, and
    wherein the intervening portion surrounds the scheduled portion and the protrusion is circumferentially continuously or circumferentially partly provided on a part of the intervening portion.

4. The wiring thin plate according to claim 1,
    wherein the protrusion has the same sectional layered shape as the wiring part.

5. The wiring thin plate according to claim 1,
    wherein the protrusion is made of the same material as the insulating layer.

6. A flexure for a head suspension comprising the wiring thin plate according to claim 1, further comprising:
    a slider provided to the supporting layer and having read/write elements to which the wiring part is connected,
    wherein the supporting layer is to be joined to a base plate or a load beam of the head suspension serving as the metal member through the welded spot to be formed on the scheduled portion.

7. The flexure according to claim 6, further comprising:
    a tongue onto which the slider is attached provided at a front end portion of the supporting layer in a longitudinal direction;

wherein the supporting layer further has a front projection that protrudes longitudinally forward relative to the tongue and the scheduled portion is defined on the front projection, wherein the front projection surrounds the scheduled portion and the protrusion is formed on a portion of the front projection.

8. The flexure according to claim 7, wherein the protrusion is formed onto an edge of the front projection or onto each one of said edge and a portion between the scheduled portion and the wiring part.

9. The flexure according to claim 8, wherein the protrusion is arranged symmetrically in a sway direction of the head suspension.

10. A method of welding the wiring thin plate according to claim 1 to a metal member, comprising:

overlaying the wiring thin plate and the metal member one on another;

bringing a flat face of a welding jig into contact with the wiring part and the protrusion so that the flat face of the welding jig spans from the wiring part to the protrusion and a through hole of the welding jig is aligned with the scheduled portion; and conducting welding to the scheduled portion through the through hole to form the welded spot.

\* \* \* \* \*